United States Patent Office.

WILLIAM PERKINS, OF RUSSELL PLACE, FITZROY SQUARE, AND GEORGE GRAINGER TANDY, OF ANERLY ROAD, HAMLET OF PENGE, ENGLAND.

*Letters Patent No. 78,125, dated May 19, 1868.*

IMPROVED MATERIAL FOR INSULATING TELEGRAPH-CONDUCTORS.

*The Schedule referred to in these Letters Patent and making part of the same.*

TO ALL WHOM IT MAY CONCERN:

Be it known that we, WILLIAM PERKINS, of Russell Place, Fitzroy Square, in the county of Middlesex, chemist, and GEORGE GRAINGER TANDY, of Anerly Road, in the Hamlet of Penge, in the county of Surrey, gentleman, have invented an "Improved Preparation or Compound Applicable for Insulating Electric Conductors, and for such purposes as India rubber and other vulcanizable gums are applicable;" and we do hereby declare that the following is a full and exact description of our said invention.

This invention has for one of its objects the production of an insulating-compound, applicable for covering telegraphic cables and electric conductors. The compound is also applicable for the various purposes for which India-rubber or gutta-percha compounds have been heretofore employed, or for which such substances may be used.

Our improved compound is produced by the combination of anthracene (or para-naphthaline) and naphthalene, and compounds thereof, with vulcanizable substances, such as India rubber, gutta percha, gum-ballata, and other analogous gums, and sulphur. The solid hydrocarbons above referred to, (anthracene and naphthalene,) are obtained amongst the last products derived from the distillation of coal-tar, the tar produced in the London gas-works being particularly rich in such hydrocarbons.

In order to mix or combine the above substances with each other, any of the well-known and understood processes for mixing or combining sulphur with such gums may be employed, but we prefer to make use of heated rollers for the purpose.

The proportions in which these substances are to be mixed will vary according to the quality of gum employed, and, whether a soft, hard, or tough compound be required. For instance, in using India rubber, it is found that the qualities of this substance vary so much that in order to produce one uniform quality of compound, considerable care must be taken, not only as to the proportions of the naphthalene or anthracene to be employed, but also as to the quantity of sulphur to be used in the compound.

In order to produce an insulating-compound for covering telegraph-wires or electric conductors, we find that a combination of fifty parts by weight of sulphured rubber, gutta percha, gum-ballata, or other vulcanizable gums, with fifty parts of naphthalene or anthracene, forms an excellent insulator, and possesses great advantages over gutta percha and vulcanite of the ordinary manufacture, as porosity in the compound is obviated.

In order to produce our improved compound, we find it advisable first to combine the sulphur with the rubber, by passing the rubber and sulphur between rollers, or by mastication in the ordinary manner, and then to add to the sulphured rubber the desired proportion of anthracene and naphthalene, which will be combined with the other materials by passing them between the rollers, as when mixing the sulphur with the rubber. In some cases, however, we add the anthracene and naphthalene, together with the sulphur, to the rubber or other gum, and we then proceed to incorporate all the ingredients, by means of masticating or grinding-rollers, as when incorporating sulphur alone with the rubber in the ordinary manner. Any of the known solvents, such as bisulphide of carbon, petroleum-spirit, or coal-tar naphtha may also be employed in combining the naphthalene or anthracene with the vulcanizable gums. When the ingredients have all been properly incorporated and intimately mixed, the mass may either be rolled out into sheets, as in the ordinary manufacture of sheet rubber, and then cut up into strips of suitable width for winding around or otherwise covering the wires, or the compound may be made up into any other form, according to the purpose for which it is to be employed.

In applying the compound to telegraph-wires or electric conductors, for the purpose of insulating them, we do not confine ourselves to any particular method, as it may be put on either in longitudinal strips or wound helically around the wires, or the insulating-compound may be applied in a plastic state to the electric conductor or cable.

After the wires have been covered, the change (or curing) of the compound is to be effected in any of the ordinary ways, viz, by means of superheated steam, by hot air, or by heating the covered wires in an oven, all of which processes are well known.

The proportions of naphthalene and anthracene to be employed may be varied from ten to seventy-five per cent., and the quantity of sulphur may vary from ten to forty per cent., according to the hardness or toughness required in the compound.

Our improved compound may be employed for any of the purposes to which India rubber, gutta percha, gum-ballata, and other analogous substances are applicable, such as for producing water-proof fabrics, elastic hose and tubing, the manufacture of boots and shoes, and various other purposes, too numerous to mention.

Having now described our invention of "an improved preparation or compound, applicable for insulating electric conductors, and for such purposes as India rubber or other vulcanizable gums are applicable," and having explained the manner of carrying the same into effect—

We claim, as our invention, the combination of anthracene or para-naphthaline and naphthalene, with India rubber, gutta percha, gum-ballata, and other analogous vulcanizable substances, and sulphur, for the purpose of producing a preparation or compound applicable to the uses or purposes above mentioned, or any analogous purposes.

In witness whereof, we, the said WILLIAM PERKINS and GEORGE GRAINGER TANDY, have hereunto set our hands and seals, the seventeenth day of March, in the year of our Lord one thousand eight hundred and sixty-eight.

WM. PERKINS. [L. S.]
GEORGE GRAINGER TANDY. [L. S.]

Witnesses:
FRED. WALKER, 66 *Chancery Lane, London.*
M. WYNN, 24 *Royal Exchange, London.*